(12) United States Patent
Ianev et al.

(10) Patent No.: US 11,924,642 B2
(45) Date of Patent: Mar. 5, 2024

(54) PRIVACY CONSIDERATIONS FOR NETWORK SLICE SELECTION

(71) Applicant: NEC CORPORATION, Tokyo (JP)

(72) Inventors: Iskren Ianev, Reading (GB); Toshiyuki Tamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 277 days.

(21) Appl. No.: 16/625,555

(22) PCT Filed: Jun. 19, 2018

(86) PCT No.: PCT/JP2018/023355
§ 371 (c)(1),
(2) Date: Dec. 20, 2019

(87) PCT Pub. No.: WO2018/235836
PCT Pub. Date: Dec. 27, 2018

(65) Prior Publication Data
US 2021/0337380 A1    Oct. 28, 2021

(30) Foreign Application Priority Data

Jun. 23, 2017    (EP) ..................... 17177701

(51) Int. Cl.
*G06F 7/04*    (2006.01)
*H04W 12/02*    (2009.01)
(Continued)

(52) U.S. Cl.
CPC ......... *H04W 12/106* (2021.01); *H04W 12/02* (2013.01); *H04W 12/03* (2021.01);
(Continued)

(58) Field of Classification Search
CPC ... H04W 12/106; H04W 12/03; H04W 12/02; H04W 12/73; H04W 48/18; H04W 60/04; H04W 60/00; H04W 76/11
(Continued)

(56) References Cited

U.S. PATENT DOCUMENTS

2003/0023451 A1* 1/2003 Willner ............... G06F 21/6245
                                                                     705/26.1
2011/0126295 A1    5/2011 Resch
(Continued)

FOREIGN PATENT DOCUMENTS

WO    2010/037299 A1    4/2010

OTHER PUBLICATIONS

Li et al., Method and Apparatus for General User Equipment Registration (U.S. Appl. No. 62/ 455,492), filed Feb. 6, 2017. (Year: 2017).*

(Continued)

*Primary Examiner* — Brandon Hoffman
*Assistant Examiner* — Samuel Ambaye
(74) *Attorney, Agent, or Firm* — Sughrue Mion, PLLC

(57) ABSTRACT

User equipment performing communication with a core network node by using network slices obtained by logically dividing a network includes: means for sending information related to security of one network slice; and means for sending identity information of the one network slice in a secure method, based on a request to send information in the secure method sent from the core network node based on the sent information.

5 Claims, 8 Drawing Sheets

(51) Int. Cl.
| | | |
|---|---|---|
| *H04W 12/03* | (2021.01) | |
| *H04W 12/106* | (2021.01) | |
| *H04W 12/73* | (2021.01) | |
| *H04W 48/18* | (2009.01) | |
| *H04W 60/04* | (2009.01) | |

(52) U.S. Cl.
CPC ........... *H04W 12/73* (2021.01); *H04W 48/18* (2013.01); *H04W 60/04* (2013.01)

(58) Field of Classification Search
USPC .......................................................... 726/2
See application file for complete search history.

(56) References Cited

U.S. PATENT DOCUMENTS

| | | | | |
|---|---|---|---|---|
| 2017/0303259 | A1* | 10/2017 | Lee ........................ | H04W 72/51 |
| 2018/0227872 | A1* | 8/2018 | Li ............................ | H04W 76/20 |
| 2018/0249479 | A1* | 8/2018 | Cho ..................... | H04W 12/106 |
| 2018/0270666 | A1* | 9/2018 | Lee ..................... | H04W 12/084 |
| 2020/0120589 | A1* | 4/2020 | Velev .................... | H04W 76/25 |
| 2021/0204349 | A1* | 7/2021 | Jin ........................ | H04W 48/16 |

OTHER PUBLICATIONS

Lee et al., Network Access Privacy (U.S. Appl. No. 62/472,954), filed Mar. 17, 2017 (Year: 2017).*

Li et al., Method And Apparatus For general User Equipment Registration (U.S. Appl. No. 62/455,492), filed Feb. 5, 2017. (Year: 2017).*

3rd Generation Partnership Project (3GPP), Feb. 2017, 3GPP Organizational Partners Publications offices. (Year: 2017).*

"3rd Generation Partnership Project; Technical Specification Group Services and System Aspects; System Architecture for the 5G System; Stage 2 (Release 15)", 3GPP TS 23.501 V1.0.0, Jun. 2017, 145 pages.

"3rd Generation Partnership Project; Technical Specification Group Services and System Aspects; General Packet Radio Service (GPRS) enhancements for Evolved Universal Terrestrial Radio Access Network (E-UTRAN) access (Release 14)", 3GPP TS 23.401 V14.5.0, Sep. 2017.

"TS 23.501: Privacy considerations for network slicing", Qualcomm Incorporated, ZTE, SA WG2 Meeting #S2-121, S2-174055, May 15-19, 2017, pp. 1-6.

"TS 23.501: Privacy considerations for network slicing", Qualcomm Incorporated, SA WG2 Meeting #S2-121, S2-173104, May 15-19, 2017, pp. 1-7.

"Privacy & security of registration and slice selection information", Qualcomm Incorporated, 3GPP TSG SA WG3 (Security) Meeting #86Bis, S3-170845, Mar. 27-31, 2017, pp. 1-2.

"pCR to TR 33.899: Proposal of Title: solution for key issue of network slicing security", 3GPP TSG SA WG3 (Security) Meeting #84, S3-161265, Jul. 25-29, 2016, pp. 1-3.

Written Opinion for PCT/JP2018/023355, dated Aug. 10, 2018.

International Search Report for PCT/JP2018/023355, dated Aug. 10, 2018.

CN Office Action for CN Application No. 201880042143.5, dated Nov. 9, 2022 with English Translation.

Huawei et al., "Clarification on Solution # 1.1 and # 1.3", 3GPP TSG SA WG3 (Security) Meeting #85, S3-161667, Nov. 11, 2016, pp. 1-2.

Huawei et al., "Update to procedures to support intermediate UPF relocation and LADN", 3GPP tsg_sa/WG2_Arch, S2-174329, Jun. 20, 2017, pp. 1-8.

Huawei et al., "Further Discussion on Slice Selection Information over RRC", 3GPP tsg_ran/WG2_RL2, R2-1706774, Jun. 17, 2017, pp. 1-2.

* cited by examiner

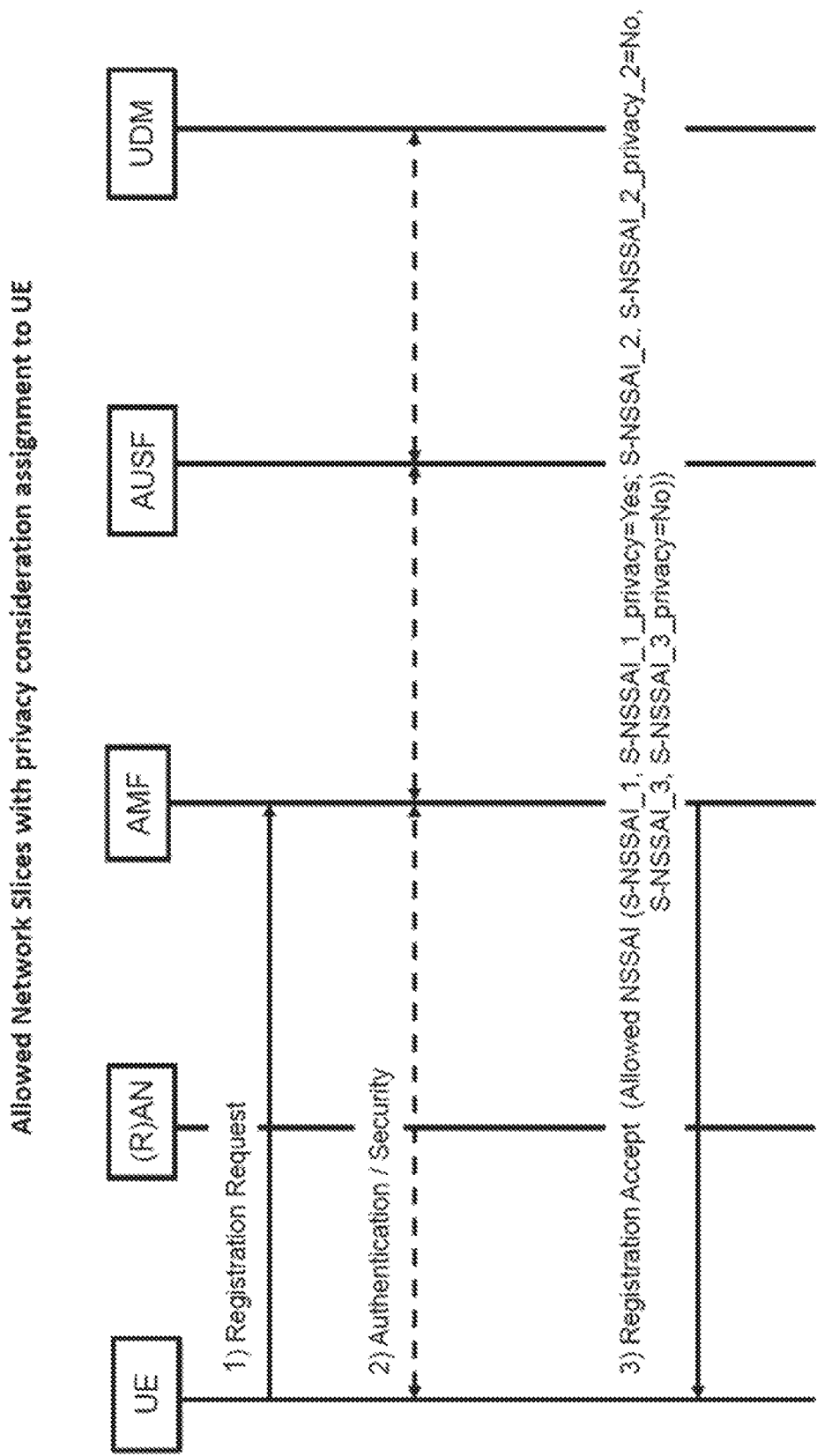

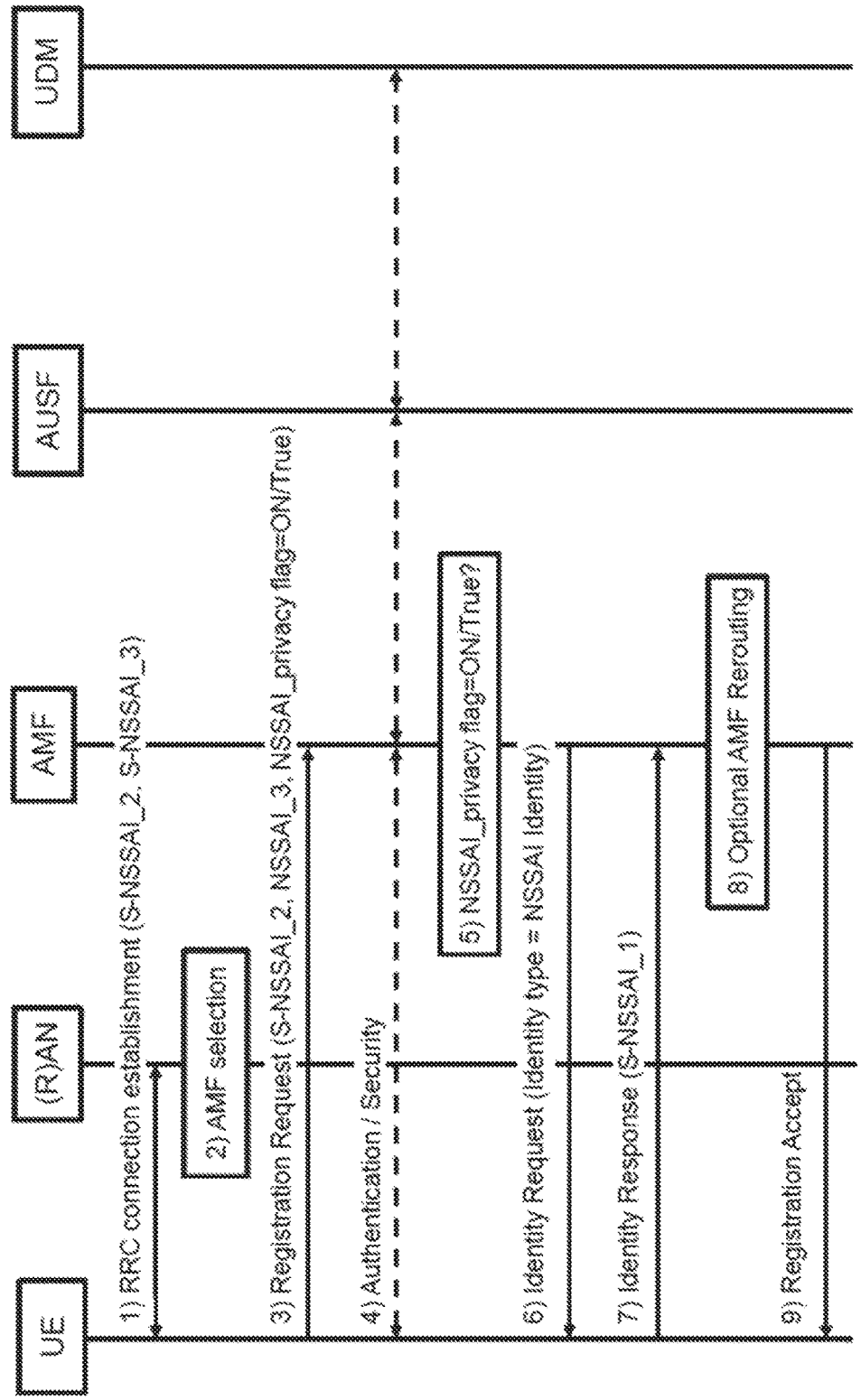
[Fig. 2]

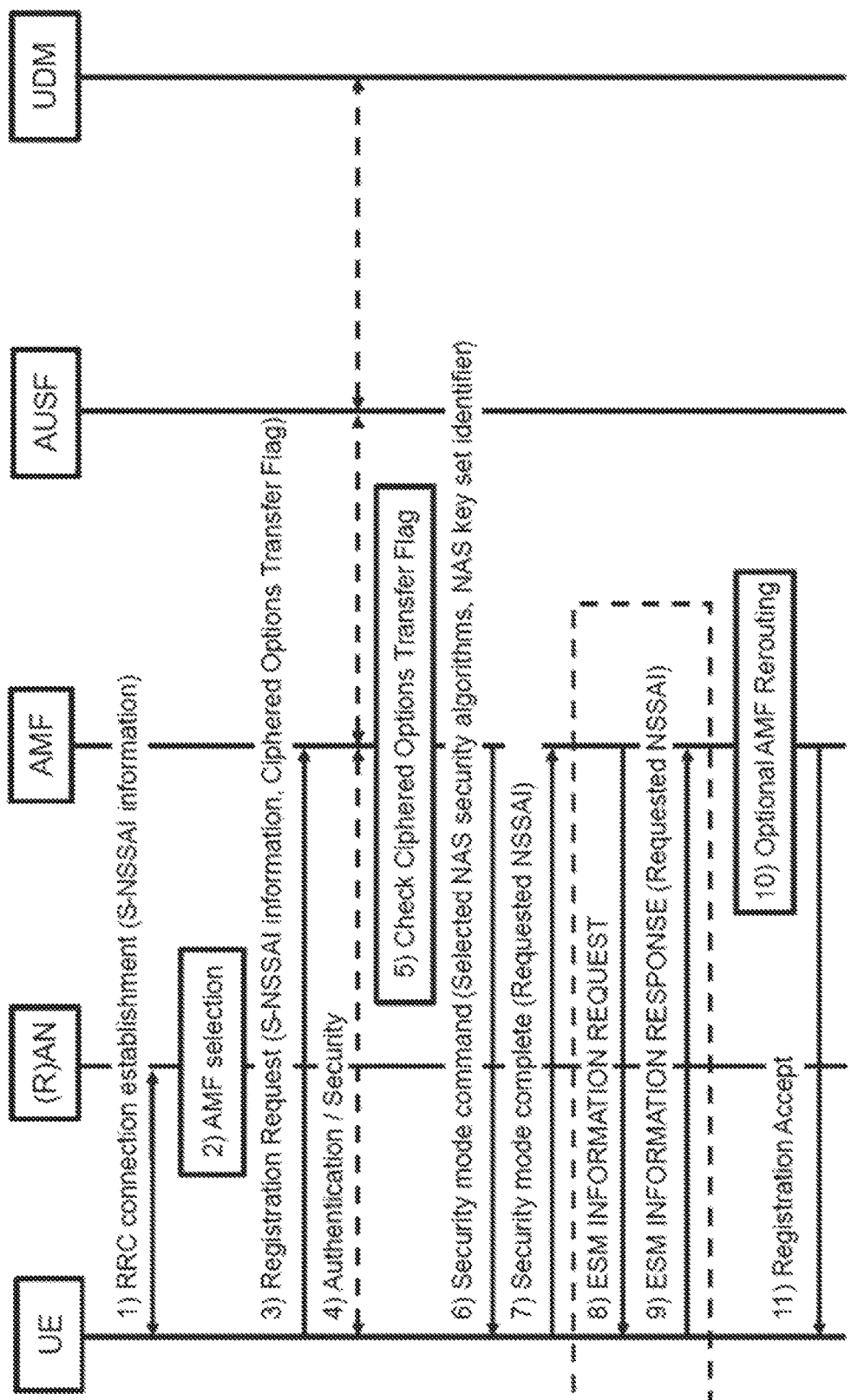

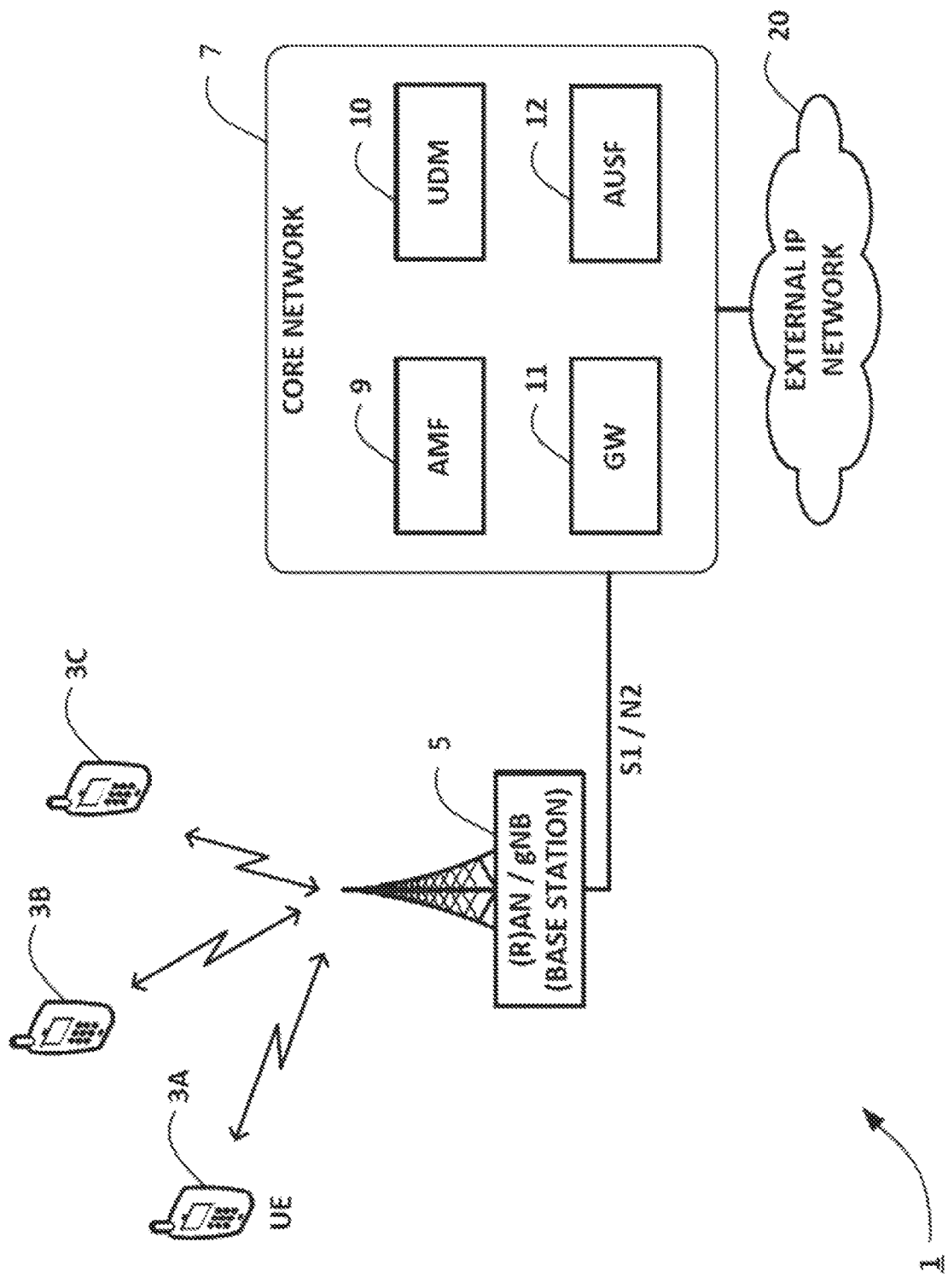
[Fig. 4]

[Fig. 5]
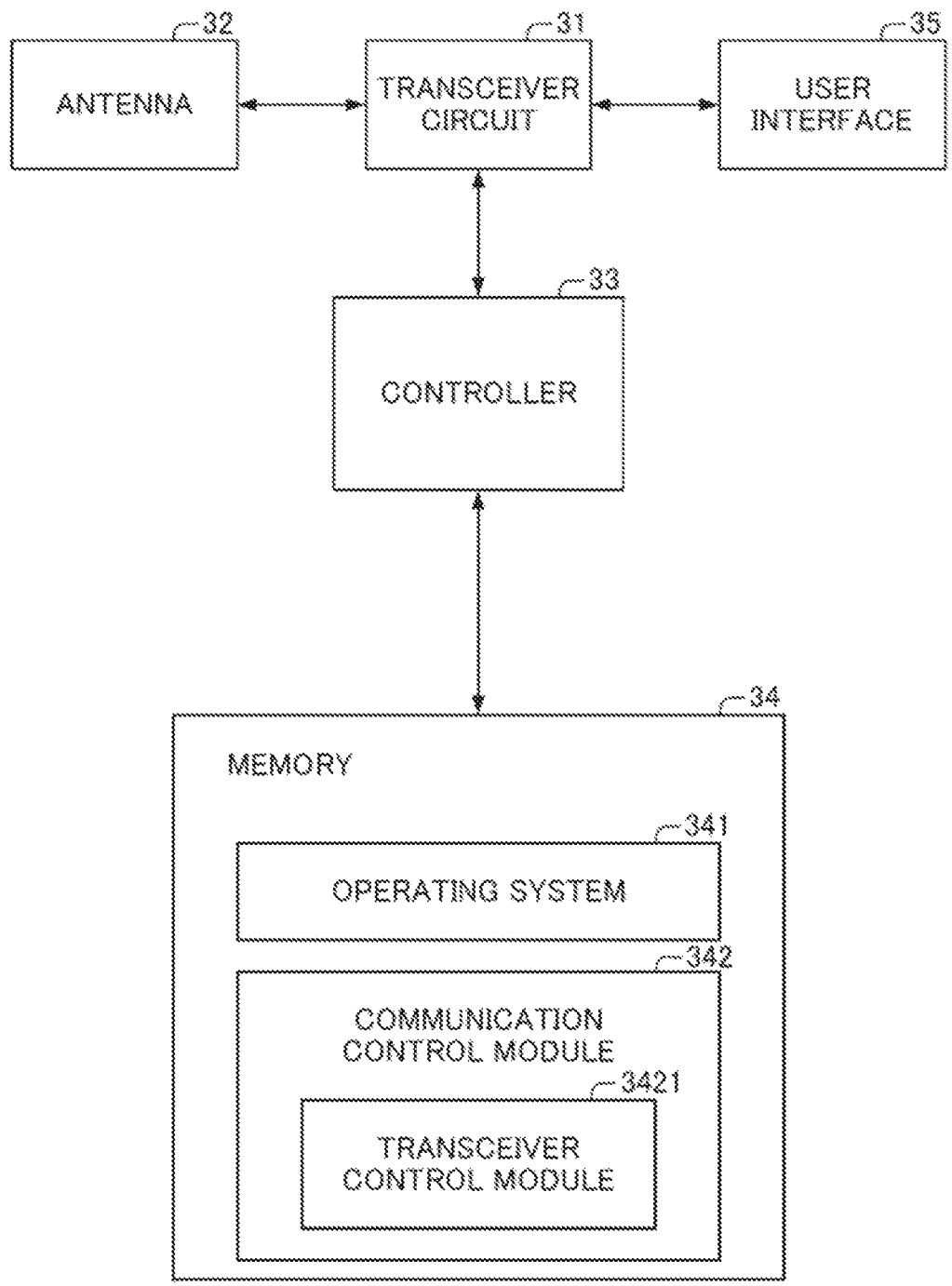

[Fig. 6]
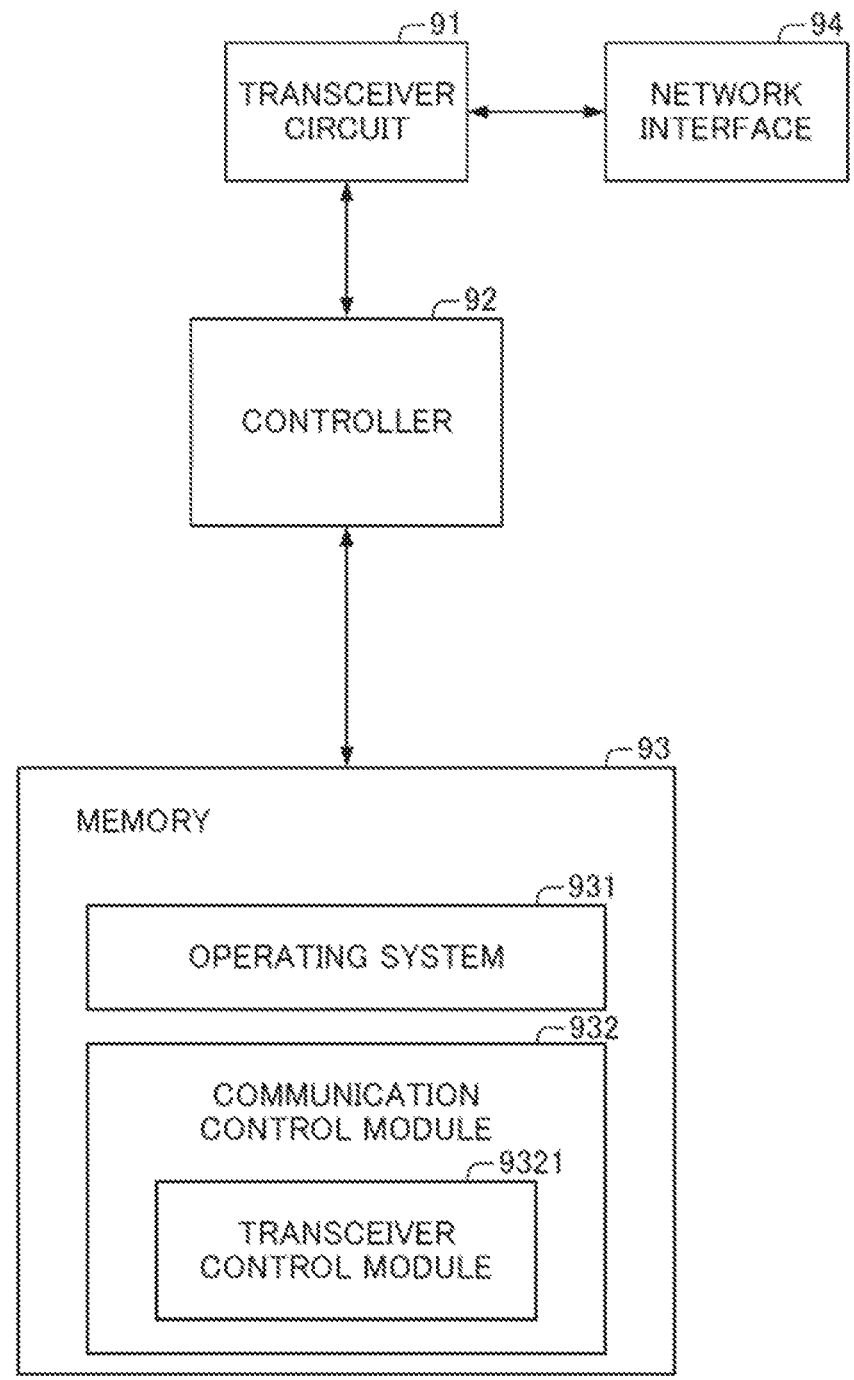

[Fig. 7]
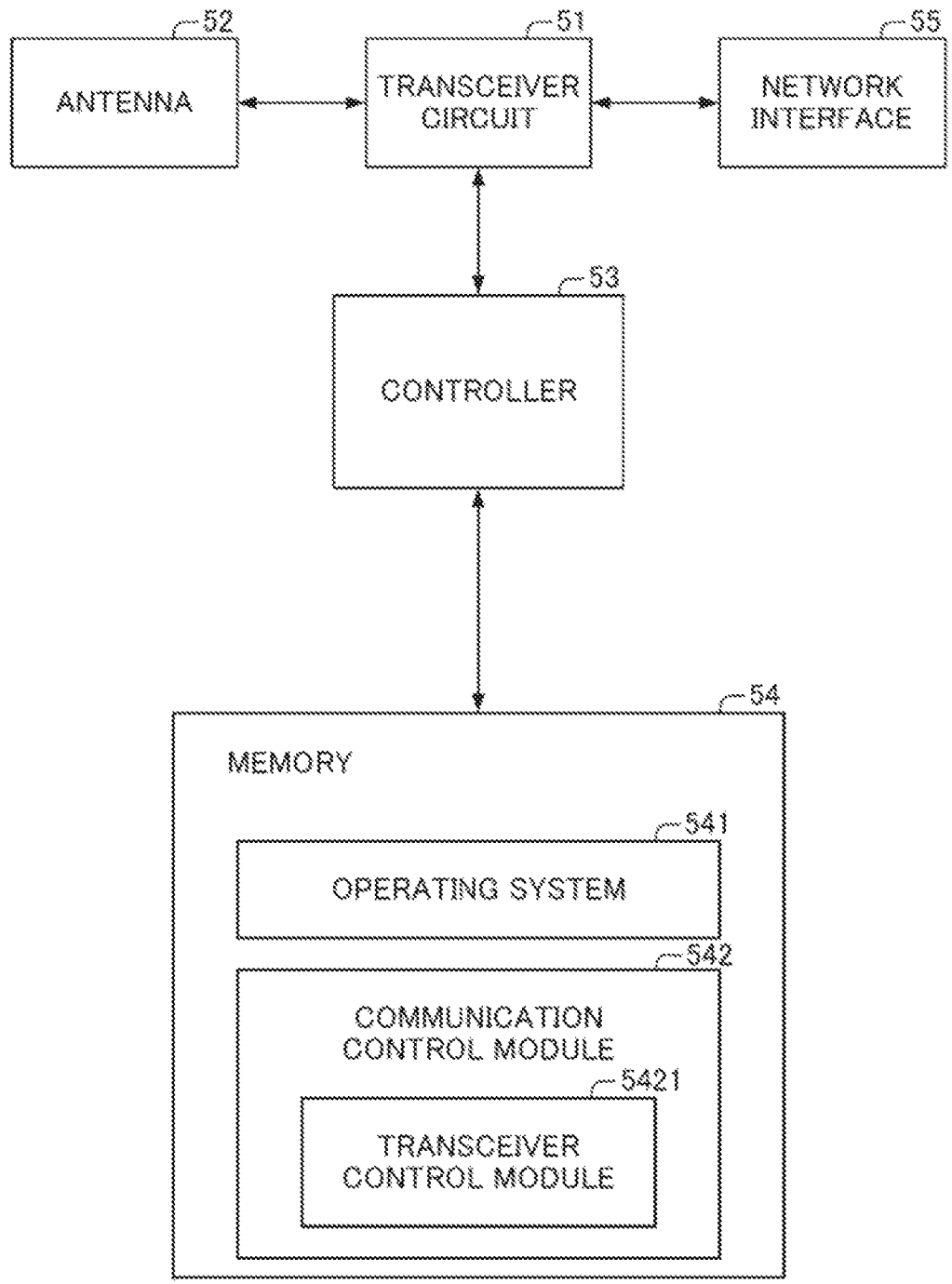
[Fig. 8]
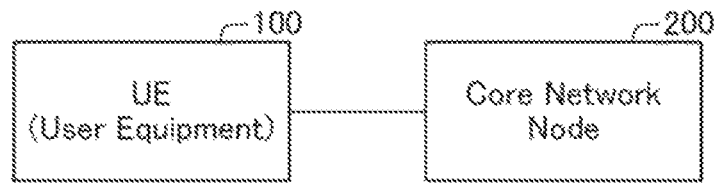

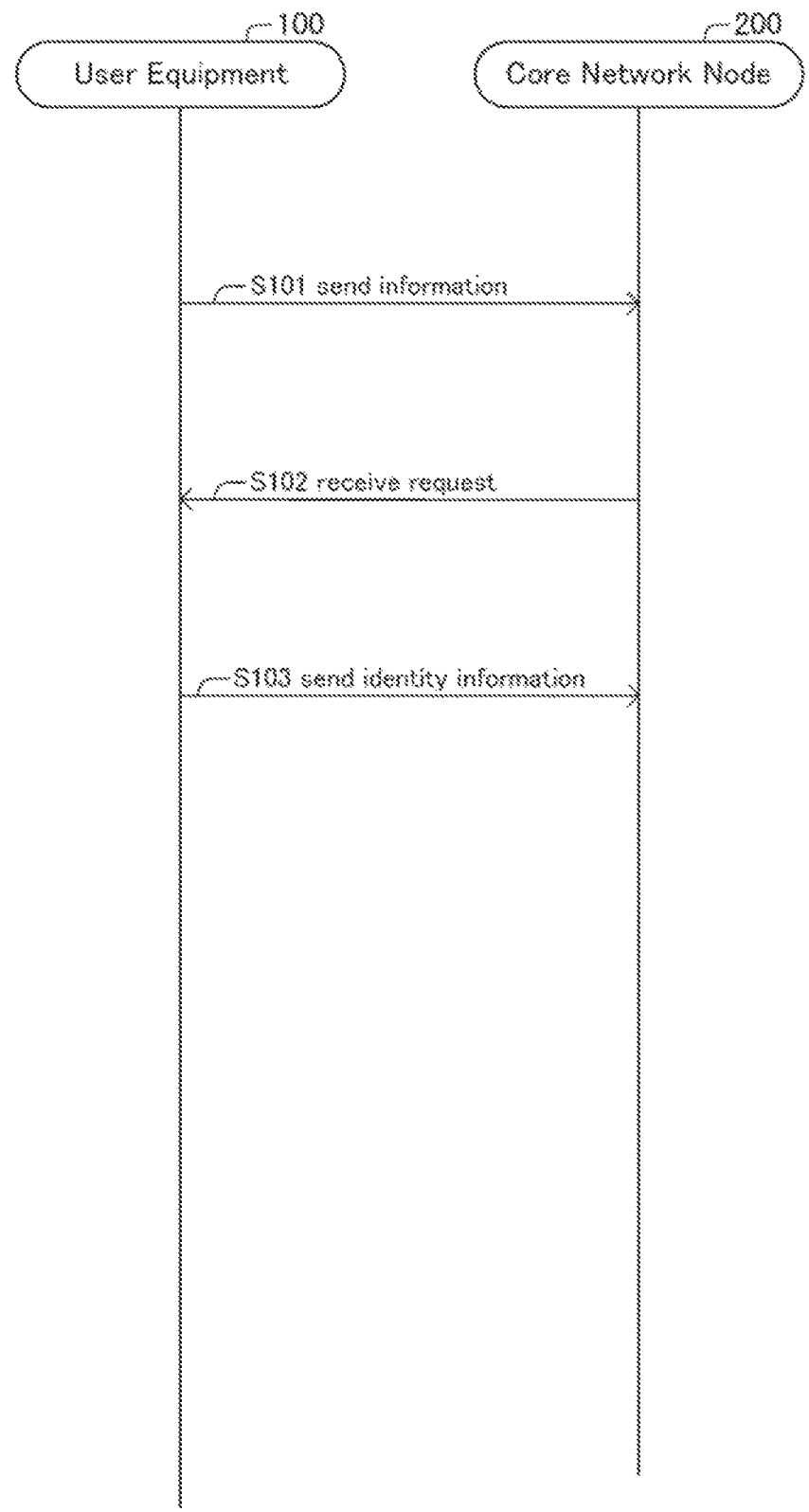

PRIVACY CONSIDERATIONS FOR NETWORK SLICE SELECTION

CROSS REFERENCE TO RELATED APPLICATIONS

This application is a National Stage of International Application No. PCT/JP2018/023355 filed Jun. 19, 2018, claiming priority based on European Patent Application No. 17177701.4 filed Jun. 23, 2017, the disclosure of which is incorporated herein in its entirely by reference.

TECHNICAL FIELD

The present disclosure relates to a communication system. The disclosure has particular but not exclusive relevance to wireless communication systems and devices thereof operating according to the 3rd Generation Partnership Project (3GPP) standards or equivalents or derivatives thereof. The disclosure has particular although not exclusive relevance to network slice privacy in the so-called 'Next Generation' systems.

BACKGROUND ART

3GPP has been working on a system architecture for the next generation (5G) mobile networks. One of the main key issues is to allow for Network Slicing that enables the operators to create networks customized to provide optimized solutions for different market scenarios which demand diverse requirements. Effectively, each network slice is a logically separated network where the resources (e.g. processing, storage, and/or networking resources) for that network slice are isolated.

The following Network Slicing definitions and principles have been agreed in Non-Patent Document 1 (listed in non-alphabetical order):

S-NSSAI—An S-NSSAI (Single Network Slice Selection Assistance information) identifies a Network Slice.

S-NSSAI is comprised of:

A Slice/Service type (SST), which refers to the expected Network Slice behavior in terms of features and services;

A Slice Differentiator (SD), which is optional information that complements the Slice/Service type(s) to allow further differentiation for selecting a Network Slice instance from the potentially multiple Network Slice instances that all comply with the indicated Slice/Service type. This information is referred to as SD.

S-NSSAI scope—The S-NSSAI can have standard values or Public Land Mobile Network (PLMN)-specific values. S-NSSAIs with PLMN-specific values are associated to the PLMN ID of PLMN that assigns it. An S-NSSAI shall not be used by the UE in access stratum procedures in any PLMN other than the one to which the S-NSSAI is associated.

NSSAI—The Network Slice Selection Assistance Information is a collection of S-NSSAIs.

Allowed NSSAI—an NSSAI provided by the serving PLMN during e.g. a registration procedure, indicating the NSSAI allowed by the network for the User Equipment (UE) in the serving PLMN for the current registration area. For each PLMN, the UE shall store the Configured NSSAI and, if any, the Allowed NSSAI. When the UE receives an Allowed NSSAI for a PLMN, the UE shall store the Allowed NSSAI and override any previously stored Allowed NSSAI for this PLMN.

Configured NSSAI—an NSSAI that has been provisioned in the UE. A UE can be configured by the Home Public Land Mobile Network (HPLMN) with a Configured NSSAI per PLMN. A Configured NSSAI can be PLMN-specific and the HPLMN indicates to what PLMN(s) each Configured NSSAI applies, including whether the Configured NSSAI applies to all PLMNs, i.e., the Configured NSSAI conveys the same information regardless of the PLMN the UE is accessing (e.g. this could be possible for NSSAIs containing only standardized S-NSSAIs).

Requested NSSAI—may be either:

the Configured-NSSAI, or a subset thereof as described below, if the UE has no Allowed NSSAI for the current PLMN; or the Allowed-NSSAI, or a subset thereof as described below, if the UE has an Allowed NSSAI for the current PLMN, or the Allowed-NSSAI, or a subset thereof as described below, plus one or more S-NSSAIs from the Configured-NSSAI for which no corresponding S-NSSAI is present in the Allowed NSSAI and that were not previously permanently rejected (as defined below) by the network for the present tracking area.

Network Slice—A logical network that provides specific network capabilities and network characteristics.

Network Slice instance—A set of Network Function instances and the required resources (e.g. compute, storage and networking resources) which form a deployed Network Slice.

NSSP—Network Slice Selection Policy. The network operator may provision the UE with NSSP. The NSSP includes one or more NSSP rules each one associating an application with a certain 5-NSSAI.

Initial Registration—UE registration in RM-DEREGISTERED state.

Another Network Slice feature that has been recently discussed in 3GPP Working Groups SA3 and SA2 is about privacy of UE registration and network slice selection information. SA3 has concluded that all Non Access Stratum (NAS) messages, including the initial registration and the subsequent messages shall always be integrity protected. The only possible exception is, in addition to the NAS messages related to unauthenticated emergency services, the NAS messages that are required to establish a valid security context between the UE and the Access and Mobility Management Function (AMF) when there is no such context available in the UE (e.g., no stored security context available at the UE from a previous successful registration). In other words, when there is no valid security context stored at the UE, the registration message shall only include information that are required to establish the security context (e.g., subscription identifier, UE security capabilities).

With regards to including NSSAI/S-NSSAI (or parts of it) used for slicing in the initial registration and subsequent NAS messages, SA3 concluded the following (in LS S2-172650 to SA2):

Including such information in the non-integrity protected NAS messages shall be avoided—otherwise, an attacker may manipulate these information to perform service downgrade (or bid-down) and denial of service attacks.

Including such information in non-confidentiality protected NAS messages compromises the privacy as information about the slices that are being used by the UE/user is leaked. While such privacy may not be needed for all slices, access to some network slices or slice types that are considered privacy sensitive requires privacy protection—e.g., access to public safety related slice(s), enterprise or dedicated private slice(s). Therefore, at least for the slices that require privacy, these information shall not be sent without confidentiality protection.

As a result of the network slice privacy requirements from 3GPP Working Group SA3, the SA2 agreed the following text in Non-Patent Document 2 (v14.5.2) in S2-174055.

5.15.5.X Slice Privacy Considerations

In order to support network-controlled privacy of slice information for the slices the UE accesses, when the UE is aware or configured that privacy considerations apply to NSSAI information:

the UE shall not include such information in NAS signaling until the UE has a NAS security context the UE shall not include such information in unprotected Radio Resource Control (RRC) signaling Editor's Note: it is FFS how the UE is aware or configured that the network has privacy considerations for NSSAI information."

CITATION LIST

Patent Literature

[NPL 1]
3GPP Technical Specification (TS) 23.501
[NPL 2]
TS 23.401

Based on the above decisions in 3GPP Working Groups SA3 (in their LS to SA2) and SA2 in the agreed Slice Privacy considerations in Non-Patent Document 1, it is an open issue:

How the UE is aware that the network has privacy considerations for NSSAI information (see the Editor's Note in Non-Patent Document 2, v14.5.0, s. 5.15.5.X Slice Privacy Considerations).

How the NSSAI or S-NSSAI with private considerations are sent to the network during the initial registration (i.e. when no security context available in the UE).

Thus, there has been a problem of how to realize communication with privacy considerations for performing communication using Network Slicing.

SUMMARY

Accordingly, an object of the present disclosure is to provide user equipment, a core network node, a control method and a system that solve the problem of how to realize communication with privacy considerations for performing communication using Network Slicing.

User equipment as an aspect of the present disclosure includes:

means for sending information related to security of at least one network slice; and means for sending identity information of the at least one network slice in a secure method based on a request to send data in the secure method, the request being sent from a core network node based on the sent information.

Further, a core network node as another aspect of the present disclosure includes means for, when receiving information related to security of at least one network slice from user equipment, sending a request to send data in a secure method based on the received information.

Further, a method as another aspect of the present disclosure is a control method in user equipment including:

sending information related to security of at least one network slice; and sending identity information of the at least one network slice in a secure method based on a request to send data in the secure method, the request being sent from a core network node based on the sent information.

Further, a method as another aspect of the present disclosure is a control method in a core network node including, when receiving information related to security of at least one network slice from user equipment, sending a request to send data in a secure method based on the received information.

Further, a system as another aspect of the present disclosure is a mobile communication system including:

user equipment configured to send information related to security of at least one network slice; and a core network node configured to send a request to send data in a secure method, based on the information, wherein the user equipment is further configured to send identity information of the at least one network slice in the secure method, based on the request received from the core network node.

With the configurations as described above, the present disclosure can provide user equipment, a core network node, a control method and a system that solve the problem of how to realize communication with privacy considerations for performing communication using Network Slicing.

BRIEF DESCRIPTION OF DRAWINGS

FIG. 1 is a sequence diagram showing an example of processing in a telecommunication system 1;

FIG. 2 is a sequence diagram showing an example of processing in the telecommunication system 1;

FIG. 3 is a sequence diagram showing an example of processing in the telecommunication system 1;

FIG. 4 is a view showing an example of an overall configuration of the telecommunication system 1;

FIG. 5 is a block diagram showing an example of a configuration of UE shown in FIG. 4;

FIG. 6 is a block diagram showing an example of a configuration of an AMF shown in FIG. 4;

FIG. 7 is a block diagram showing an example of a configuration of AN shown in FIG. 4;

FIG. 8 is a block diagram showing an example of a configuration of a system in a second example embodiment of the present disclosure; and FIG. 9 is a sequence diagram showing an example of processing in the system in the second example embodiment of the present disclosure.

DESCRIPTION OF EMBODIMENTS

First Example Embodiment

There are two solutions described in this document.

Solution 1: Network Slice Privacy Consideration by the UE and the Network in Initial Registration Solution 1 may be divided into two stages.

Stage A) Network Slice privacy assignment or configuration by the network.

One solution for network slice privacy assignment is via the registration procedure. It is proposed that during UE registration to the network, the network may assign a privacy consideration for each Network Slice (e.g. NSSAI or S-NSSAI) provided to the UE in the Registration Accept message as Allowed Network Slices (e.g. Allowed NSSAI or Allowed 5-NSSAIs). The Allowed NSSAI/S-NSSAIs are also called Accepted NSSAI/S-NSSAIs or Registered NSSAI/S-NSSAIs. See FIG. 1 for the procedure of Network Slice privacy attribute assignment.

A UE needs to register with the network to get authorized to receive services, to enable mobility tracking and to enable reachability. The Registration procedure is used when the UE needs to perform initial registration to the 5G system, mobility registration update upon changing to a new Tracking area (TA) outside the UE's registration area in idle mode, when the UE performs a periodic registration update (due to a predefined time period of inactivity), and additionally when the UE needs to update its capabilities or protocol parameters that are negotiated in the Registration procedure.

1) Registration Request (Registration type, Subscriber Permanent Identifier or Temporary User ID, Security parameters, NSSAI).

The Registration type indicates if the UE wants to perform an "initial registration" (i.e. the UE is in RM-DEREGISTERED non-registered state), a "mobility registration update" or a "periodic registration update". The UE performing an initial registration to a PLMN for which the UE does not already have a 5G-Globally Unique Temporary Identifier (GUTI), the UE shall include its 5G Subscriber Permanent Identifier (SUPI) in the registration attempt. The Security parameters are used for Authentication and integrity protection. NSSAI indicates the Network Slice Selection Assistance Information.

2) Authentication/Security—The AMF may decide to invoke an Authentication and Security procedures (AUSF). If network slicing is used, the AMF decides if the Registration Request needs to be rerouted.

3) Registration Accept (Temporary User ID, Registration area, Mobility restrictions, NSSAI, Periodic registration update timer). The AMF sends a Registration Accept message to the UE indicating that the registration has been accepted. Temporary User ID is included if the AMF allocates a new Temporary User ID. Mobility restrictions are included in a case where mobility restrictions apply for the UE. The NSSAI includes the Allowed S-NSSAIs. Optionally, the network (e.g. AMF) may also include information about the privacy of allowed network slices (e.g. the Allowed NSSAI which is also known as an Accepted NSSAI or Registered NSSAI). The network slice privacy information can be per network slice, per NSSAI (network slice selection assistance information) as a whole or per S-NSSAI when the NSSAI is represented by one or more S-NSSAIs. The network slice privacy of the NSSAI/S-NSSAI can be relayed to the UE within the Registration Accept message (or any other NAS message from the network to the UE in secure mode) as a parameter/indication per NSSAI or per each S-NSSAI within the NSSAI, as shown in the FIG. 1. The network slice privacy parameter/indication per NSSAI/S-NSSAI indicates whether the related network slice (e.g. NSSAI or S-NSSAI) shall be treated as a private (e.g. when the network slice privacy parameter is set to ON, or to True or any other value or way of setting in order to indicate that the network considers the network slice (e.g. NSSAI or S-NSSAI) as a private).

If the network has set the network slice privacy parameter as private, then the UE shall send the initial registration message (e.g. Registration Request that is not encrypted) however the UE shall not include the network slice (e.g. NSSAI or S-NSSAI) that has got its privacy attribute set as a private in the non-encrypted NAS message (e.g. Registration Request message) or non-encrypted RRC message (e.g. RRC Connection Request or RRC Connection Setup Complete messages).

If the network has set the network slice privacy parameter as 'non-private' or it has simply not included the privacy parameter for that network slice (e.g. for NSSAI or S-NSSAI), then the UE is allowed to include that network slice (e.g. NSSAI or S-NSSAI) in a non-encrypted NAS message (e.g. Registration Request) or non-encrypted RRC message (e.g. RRC Connection Request or RRC Connection Setup Complete message).

As different network operators (e.g. PLMNs) may have different consideration on the network slice privacy, it is also possible that each network indicates to the UE (e.g. via broadcast, signaling or any other way) whether the network slice privacy considerations are supported or not or just supported for that time or location only (as the network slice privacy consideration support can be controllable by the network operator and it may change with the location and time or with any other network operator configuration policy).

In another example embodiment, the network can set the network slice privacy only for the SD (Slice Differentiator) part of the S-NSSAI. It means that only the SD part of the network slice (e.g. NSSAI or S-NSSAI) is considered for a privacy protection. In this case, the UE shall not include the SD part of network slice (e.g. NSSAI or S-NSSAI) in a non-encrypted NAS message (e.g. Registration Request message) or non-encrypted RRC message (e.g. RRC Connection Request or RRC Connection Setup Complete messages). However, the UE can include the Slice/Service Type (SST) part of network slice (e.g. S-NSSAI) in a non-encrypted NAS message (e.g. Registration Request message) or non-encrypted RRC message (e.g. RRC Connection Request or RRC Connection Setup Complete messages).

In this case, the inclusion of the SST part of the network slice selection information (e.g. NSSAI or S-NSSAI) can increase the chances for AMF selection that supports all the network slices requested by the UE and thus avoid/mitigate a possible AMF rerouting later.

In another example embodiment the network slice privacy assignment can be arranged via configuration in the UE by the network operator. A network operator can configure the UE with network slice information (e.g. NSSAI and/or S-NSSAIs) that is called Configured NSSAI/S-NSSAI. The network operator can configure the UE with Configured NSSAI and/or S-NSSAIs per PLMN. The network operator can also configure a privacy attribute (e.g. privacy flag or parameter) for each configured network slice (e.g. Configured NSSAI or Configured S-NSSAIs). The method of configuration with the network slice privacy is more static compared with the network slice privacy assignment during registration.

The configuration of the UE with configured NSSAI and/or S-NSSAIs and the configuration of their privacy can be also done via the following methods:

The Open Mobile Alliance Device Management (OMA DM) Access Control List (ACL) property mechanism (see 3GPP TS 24.368 v14.2.0) may be used to configure the network slice (e.g. NSSAI or S-NSSAI) with a privacy attribute (ON, OFF or SD part ON). For the UE a new configuration leaf in TS 24.368 can be defined with the purpose of indicating whether the configured network slice (e.g. configured NSSAI or configured S-NSSAI) is with security consideration or not.

SMS—the configuration of the UE with per PLMN NSSAI and/or S-NSSAIs and their privacy status can be done via the Short Message Service (SMS), as well.

Any other way of dynamic or static configuration by the network operator.

Stage B). Network Slices with privacy consideration relay to the network during the initial registration.

One solution for how to relay a network slice (e.g. NSSAI or S-NSSAI) with privacy considerations (privacy attribute ON, OFF or SD part ON) during initial registration of the UE, when the first NAS message (e.g. Registration Request) is with no security protection (unencrypted), is demonstrated in FIG. 2.

A UE needs to register with the network to get authorized to receive services, to enable mobility tracking and to enable reachability. The Registration procedure in FIG. 2 is used when the UE needs to perform initial registration to the 5G system and there is no security context in the UE from previous registration with this network, which means that the first NAS message from the UE (e.g. Registration Request message) and the RRC signaling messages beforehand will be unprotected. Also, the UE has got an Allowed or Configured network slices, e.g. configured/allowed NSSAI that consist of S-NSSAI_1 with a privacy attribute 'S-NSSAI_1_privacy'=ON/True (present privacy consideration), S-NSSAI_2 with a privacy attribute 'S-NSSAI_2_privacy'=OFF/False (no privacy consideration) and S-NSSAI_3 with 'S-NSSAI_3_privacy'=OFF/False (no privacy consideration).

1) RRC Connection Establishment—To register with the network, the UE first establishes RRC connection with the (R)AN node. If this is an initial registration, e.g. there is no valid security context for the PLMN the UE wants to register with, the RRC signaling would be unencrypted. If so, the UE includes in the RRC signaling messages (e.g. RRC Connection Request or RRC Connection Setup Complete messages or any other RRC signaling message) only the parts of the NSSAI that is with no privacy consideration (e.g. S-NSSAI_2 and S-NSSAI_3 as they are with no privacy considerations).

2) AMF selection—The (R)AN node selects an AMF that supports Network Slice(s) as requested by the UE (e.g. S-NSSAI_2 and S-NSSAI_3) in the RRC signaling as there is no valid 5G GUTI or Temporary AMF ID provided by the UE in the RRC signaling for this initial registration.

3) Registration Request (S-NSSAI_2, S-NSSAI_3, NSSAI_privacy flag)—In the Registration Request message the UE includes the part of the network slice selection assistance information (NSSAI) that is with no privacy considerations, e.g. S-NSSAI_2 and S-NSSAI_3 only as the registration is for initial registration with no valid security context available in the UE, i.e. the Registration Request message is unencrypted. The UE does not include the part of the network slice selection assistance information (NSSAI) that is with security consideration (e.g. S-NSSAI_1 which has NSSAI privacy flag=On/True).

However, the UE indicates to the network in a new parameter, e.g. NSSAI_privacy flag=On/True or S-NSSAI-privacy flag=On/True or any other way to indicate that the part of NSSAI is with security consideration and has not been provided to the network yet. That is, the UE can send information relating to security on a slice.

4) Authentication/Security—The AMF may decide to invoke an Authentication and Security procedures (AUSF).

5) After security connection between the UE and the network is established, the AMF checks the NSSAI_privacy flag provided by the UE in the initial Registration Request message. If this flag is set ON/True (i.e. the UE has not provided yet the whole NSSAI or the part of the NSSAI that is with privacy consideration (e.g. S-NSSAI_1)), the AMF needs to get the outstanding part of the NSSAI via security protected (encrypted) procedure. One possibility is to use the existing Identity Request/Response procedure that is modified for the purpose.

6) Identity Request—The network may make use of the Identity procedure to get the outstanding part of the NSSAI from the UE (e.g. S-NSSAI_1) that requires transfer in a secure protected mode only. For this, the AMF may include in the Identity Request message a new parameter (e.g. 'NSSAI identity' or just a new 'NSSAI Identity' value for the existing 'UE Identity' parameter or any other way to indicate a request to the UE to send the outstanding part of the NSSAI (the whole or part of the NSSAI that is with privacy consideration) in the Identity Response message. That is, the AMF can send a request for sending information in a secure method to the UE based on information received from the UE.

7) Identity Response—When the UE receives Identity Request message with the new 'NSSAI identity' (or any other indication requiring the UE to send the whole or part of the NSSAI that has not been sent in the initial Registration Request message for privacy reasons), the UE responds with Identity Response message in which the UE includes the whole or part of the network slice selection assistance information (NSSAI) that has not yet been sent for privacy reasons (e.g. S-NSSAI_1). That is, the UE can send identity information of a slice in a secure method to the AMF based on a request received from the MF.

8) Optional AMF Re-routing—The AMF, having now received the full set of the network slice selection assistance information (NSSAI), may decide to reroute the UE to another AMF if it happens that the current AMF cannot serve the newly delivered secure part of the NSSAI (e.g. S-NSSAI_1). In this case, the current AMF makes enquiry to find an AMF that can serve the full set of the S-NSSAI(s) that constitute the network slice selection assistance information (NSSAI) received from the UE and re-route the UE to that AMF.

9) Registration Accept—Finally the AMF (current or re-routed one) accepts the initial Registration Request by the UE via returning confirmation in the Registration Accept message. In the Registration Accept message the AMF may change the Allowed NSSAI, both the set of S-NSSAIs and the privacy attribute of the S-NSSAIs. If so, the UE replaces the saved NSSAI and the privacy attributes of the member S-NSSAIs with the new set of S-NSSAIs and their new privacy attribute.

In another example embodiment the network (e.g. AMF) may make use of another secure NAS procedure (e.g. Security Mode Command/Security Mode Complete messages) or any other secure NAS procedure or message to retrieve the network slice information with privacy consideration from the UE (e.g. NSSAI or S-NSSAI). The network (e.g. the AMF) may also make use of a new secure procedure or message (as soon as a secure signaling exchange between the UE and the AMF is established) designated for the purpose of retrieving the network slice information with privacy consideration (e.g. NSSAI or S-NSSAI with privacy attributes ON/True) from the UE.

Solution 2: Network Slice Privacy Consideration by the UE and the Network with the Ciphered Options Transfer Operation.

One solution for network slice privacy assignment is via the registration procedure. It is proposed that during UE registration to the network, the UE indicates "Ciphered Options Transfer Flag" whose value is active to the network (e.g. AMF) in the Registration Request message if the UE does not know the privacy attribute of the slice(s) that UE intends to connect to. If the UE has set the "Ciphered Options Transfer Flag" to ON/True (e.g. active) in the Registration Request message, any Slice information shall be conveyed from the UE to the AMF after the NAS message has been encrypted. The "Ciphered Options Transfer Flag" can be named as other means, for example, "Evolved Packet System (EPS) Session Management (ESM) information transfer flag" or "Slice information transfer flag" or any other name to indicate that the UE does not know the privacy attribute of the requested network slice. See FIG. 3 for the procedure of Ciphered Options Transfer operation.

1) RRC Connection Establishment—To register with the network, the UE first establishes RRC connection with the (R)AN node. If this is an initial registration, e.g. there is no valid security context for the PLMN the UE wants to register with, the RRC signaling would be unencrypted. If so, the UE may include in the RRC signaling messages (e.g. RRC Connection Request or RRC Connection Setup Complete messages or any other RRC signaling message) only network slice selection information (NSSAI) or single network slice selection information (S-NSSAI) with no privacy consideration. The UE may know it based on the solution 1 or other means. (e.g. the UE has got an Allowed or Configured network slices, e.g. configured/allowed NSSAI that consist of S-NSSAI_1 with a privacy attribute 'S-NSSAI_1_privacy'=ON/True (present privacy consideration), S-NSSAI_2 with a privacy attribute 'S-NSSAI_2_privacy'=OFF/False (no privacy consideration) and 'S-NSSAI_3 with S-NSSAI_3_privacy'=OFF/False (no privacy consideration)).

UE may not include any Network Slice related information in this message (e.g. RRC Connection Request or RRC Connection Setup Complete messages or any other RRC signaling message).

2) AMF selection—The (R)AN node selects an AMF that supports Network Slice(s) (e.g. S-NSSAI_2 and S-NSSAI_3) if the UE indicated in the RRC signaling. Otherwise, that is, if the UE did not indicate any Network Slice related information in the RRC signaling, the (R)AN node selects a default AMF.

3) Registration Request (Ciphered Options Transfer Flag)—In the Registration Request message the UE includes the "Ciphered Options Transfer Flag" whose value is active in order to establish a secure NAS connection between the UE and the AMF during the Registration procedure. By doing so, the UE can send information relating to security on a slice.

4) Authentication/Security—The AMF may decide to invoke an Authentication and Security procedures (AUSF).

5) The AMF checks whether the "Ciphered Options Transfer Flag" whose value is active is in the Registration Request message or not.

6) If the "Ciphered Options Transfer Flag" whose value is active is received from the UE in the Registration Request message, the AMF sends the Security mode command to the UE in order to inform security related information, for example Selected NAS security algorithms, NAS key set identifier and others, to the UE. That is, the AMF can send a request for sending information in a secure method to the UE based on information received from the UE.

7) The UE sends the Security mode complete to the AMF with security protected NAS. This message includes Requested NSSAI. With this sequence, the Requested NSSAI can be safely transferred from the UE to the AMF over the protected NAS message. That is, the UE can send identity information of a slice to the AMF in a secure method based on a request received from the MF.

If the Security mode complete message in the step 7 includes the Requested NSSAI by the UE, then go to step 10.

8) Alternatively, the Requested NSSAI (the whole of it or part of it, e.g. S-NSSAI) can be conveyed from the UE and the AMF with separate message sequence. In this case, the Security mode complete message as indicated in step 7) does not include the Requested NSSAI.

After the successful security setup between the UE and the AMF by the step 6 and step 7, the AMF sends the ESM INFORMATION REQUEST message to the UE. The AMF may indicate in a new parameter within the ESM Information Request message that a network slice selection information is required by the UE.

9) The UE sends the ESM INFORMATION RESPONSE message to the AMF. This message may include Requested NSSAI (the whole NSSAI or parts of it, e.g. S-NSSAI(s)).

10) Optional AMF Re-routing—The AMF, having now received the full set of the network slice selection assistance information (NSSAI), may decide to reroute the UE to another AMF if it happens that the current AMF cannot serve the NSSAI (e.g. S-NSSAI_1). In this case, the current AMF makes enquiry to find an AMF that can serve the full set of the S-NSSAI(s) that constitute the network slice selection assistance information (NSSAI) received from the UE and re-route the UE to that AMF.

11) Registration Accept—Finally the AMF (current or re-routed one) accepts the initial Registration Request by the UE via returning confirmation in the Registration Accept message.

Although this procedure indicates that Security mode complete message and the ESM INFORMATION RESPONSE message can convey the network slice information securely from the UE to the AMF, any other NAS message from the UE to the AMF can be used after successful security setup between the UE and the AMF.

In addition, this mechanism can also apply to conveying security sensitive information from the UE to the AMF over the NAS message. For example, Access Point Name (APN), Data Network Name (DNN), 5G Subscriber Permanent Identifier (SUPI), etc.

Beneficially, the above described example embodiments include, although they are not limited to, one or more of the following functionalities.

Solution 1

1) New optional privacy consideration parameter per S-NSSAI in the Attach Accept message—The network slice privacy of the NSSAI/S-NSSAI can be relayed to the UE within the Registration Accept message (or any other NAS message from the network to the UE in secure mode) as a parameter/indication per NSSAI or per each S-NSSAI within the NSSAI. The network slice privacy parameter/indication per NSSAI/S-NSSAI indicates whether the related network slice (e.g. NSSAI or S-NSSAI) shall be treated as a privacy. If the network has set the network slice privacy parameter as private, then the UE shall not include that network slice (e.g. NSSAI or S-NSSAI) in a non-encrypted NAS message (e.g. Registration Request message) or non-encrypted RRC message (e.g. RRC Connection Request or RRC Connection Setup Complete messages).

2) New optional network slice privacy relayed parameter in an unprotected NAS and AS message—In Registration Request message, when unprotected, the UE indicates to the network in a new parameter, e.g. NSSAI_privacy flag=On/True or S-NSSAI-privacy flag=On/True or any other way to indicate that the part of NSSAI is with security consideration and has not been provided to the network yet.

3) New network slice privacy related parameter in the Identity Request message—the AMF may include in the Identity Request message a new parameter (e.g. 'NSSAI identity' or just a new 'NSSAI Identity' value for the existing 'UE Identity' parameter or any other way to indicate a request to the UE to send the outstanding part of the NSSAI (the whole or part of the NSSAI that is with privacy consideration) in the Identity Response message.

4) New network slice privacy related parameter in the Identity Response message—When the UE receives Identity Request message with the new 'NSSAI identity' (or any other indication requiring the UE to send the whole or part of the NSSAI that has not been send in the initial Registration Request message for privacy reasons), the UE responds with Identity Response message in which the UE includes the whole or part of the network slice selection assistance information (NSSAI) that has not yet been send for privacy reasons.

Solution 2

5) In order to transfer Network Slice related information securely between the UE and the AMF, the UE requests to set up a secure NAS connection by indicating "Ciphered Options Transfer Flag" in the Registration Request message.

6) Once secure NAS connection is setup, the NSSAI information is transferred from the UE to the AMF either within the Security Mode Complete message or within the ESM INFORMATION RESPONSE message.

In summary, it can be seen that the above described Solution 1 describes a method comprising the steps of:

1) Network slice privacy attribute assignment to the UE during registration (via the Registration Accept message) or via configuration by the network so that the UE is aware which network slice (i.e., which allowed or configured NSSAI/S-NSSAI) should be treated as a private (i.e., not relayed within a non-encrypted NAS or RRC message) and which one should be treated as non-private (i.e., can be transferred in unencrypted NAS or RRC message);

2) During initial registration (e.g. in case the Registration Request message and the RRC signaling beforehand are unencrypted) the UE shall not relay network slice information (e.g. NSSAI or S-NSSAI) that has got its private consideration attributes set ON/True in an unencrypted NAS or RRC signaling. Instead, the UE shall set a new parameter (e.g. NSSAI_privacy flag to ON/True) in the unencrypted Registration Request message in order to indicate to the network (e.g. AMF) that the whole or part of the NSSAI (e.g. S-NSSAIs) are withheld for later relay (e.g. for when a secure signaling between the UE and the network is established).

3) When the network (e.g. AMF) receives Registration request with the NSSAI_privacy flag set to ON/True (i.e. the whole or part of NSSAI is withheld for later secure relay), the network shall request the remaining network slice selection information via the Identity Request/Response procedure as soon as secure connection between the UE and the network is established. For this, the network make use of a new parameter within the Identity Request message (e.g. NSSAI identity) in order to request the delivery of the network selection information that has been withheld for secure delivery.

Further, it can be seen that the above described Solution 2 describes a method comprising the steps of:

1) In case the UE has to transfer NSSAI information to the AMF in the Registration procedure, the UE requests the AMF to establish a secure NAS connection during the Registration procedure.

2) Once secure NAS connection is setup, then the NSSAI information is transferred from the UE to the AMF either via the Security Mode Complete message or via the ESM INFORMATION RESPONSE message.

Benefits

It can be seen that the above embodiments beneficially provide a number of benefits, including (but not limited to):

Both Solution 1 and Solution 2 allow for secure network slice information relay from the UE to the network.

System Overview

FIG. 4 schematically illustrates a mobile (cellular or wireless) telecommunication system 1 to which the above embodiments are applicable.

In this network, users of mobile devices 3A to 3C can communicate with each other and other users via respective base stations 5 and a core network 7 using an Evolved Universal Terrestrial Radio Access (E-UTRA) and/or 5G radio access technology (RAT). It will be appreciated that a number of base stations (or 'gNBs' in 5G networks) form a (radio) access network. As those skilled in the art will appreciate, whilst three mobile devices 3 and one base station 5 are shown in FIG. 4 for illustration purposes, the system, when implemented, will typically include other base stations and mobile devices.

The core network 7 typically includes logical nodes (or 'functions') for supporting communication in the telecommunication system 1. Typically, for example, the core network 7 of a 'Next Generation'/5G system will include, amongst other functions, control plane functions and user plane functions.

As is well known, a mobile device 3 may enter and leave the areas (i.e. radio cells) served by the base stations 5 or the (R)AN as the mobile device 3 is moving around in the geographical area covered by the telecommunication system 1. In order to keep track of the mobile device 3 and to facilitate movement between the different base stations 5, the core network 7 comprises at least one access and mobility management function (AMF) 9. The AMF 9 is in communication with the base station 5 coupled to the core network 7. In some core networks, a mobility management entity (MME) may be used instead of the AMF.

The core network 7 also includes a user data management (UDM) node 10, one or more gateways 11, and an authentication and security function (AUSF) 12. Although not shown in FIG. 4, the core network 7 may also include further nodes, such as a home subscriber server (HSS) and/or the like.

The mobile devices 3 and their respective serving base stations 5 are connected via an appropriate air interface (for example the so-called "Uu" interface and/or the like). Neighboring base stations 5 are connected to each other via an appropriate base station to base station interface (such as the so-called "X2" interface and/or the like). The base station 5 is also connected to the core network nodes (such as the AMF 9 and the gateway 11) via an appropriate interface (such as the so-called "S1" or "N2" interface and/or the like). From the core network 7, connection to an external IP network 20 (such as the Internet) is also provided.

User Equipment (UE)

FIG. 5 is a block diagram illustrating the main components of the UE (mobile device 3). As shown, the UE includes a transceiver circuit 31 which is operable to transmit signals to and to receive signals from the connected node(s) via one or more antenna 32. Although not necessarily shown in FIG. 5, the UE will of course have all the usual functionality of a conventional mobile device (such as a user interface 35) and this may be provided by any one or any combination of hardware, software and firmware, as appropriate. Software may be pre-installed in the memory 34 and/or may be downloaded via the telecommunication network or from a removable data storage device (RMD), for example. A controller 33 controls the operation of the UE in accordance with software stored in a memory 34. The software includes, among other things, an operating system 341 and a communications control module 342 having at least a transceiver control module 3421. The communications control module 342 (using its transceiver control module 3421) is responsible for handling (generating/sending/receiving) signaling and uplink/downlink data packets between the UE and other nodes, such as the base station/(R)AN node and the AMF. Such signaling may include, for example, appropriately formatted signaling messages relating to access and mobility management procedures (for a particular UE), and in particular, signaling messages relating to network slice privacy assignment or configuration (e.g. a registration request and associated responses).

AMF

FIG. 6 is a block diagram illustrating the main components of the AMF 9. As shown, the AMF includes a transceiver circuit 91 which is operable to transmit signals to and to receive signals from other nodes (including the UE) via a network interface 94. A controller 92 controls the operation of the AMF in accordance with software stored in a memory 93. Software may be pre-installed in the memory 93 and/or may be downloaded via the telecommunication network or from a removable data storage device (RMD), for example. The software includes, among other things, an operating system 931 and a communications control module 932 having at least a transceiver control module 9321. The communications control module 932 (using its transceiver control module 9321) is responsible for handling (generating/sending/receiving) signaling between the AMF and other nodes, such as the UE, base station/(R)AN node, and AUSF. Such signaling may include, for example, appropriately formatted signaling messages relating to access and mobility management procedures (for a particular UE), and in particular, signaling messages relating to network slice privacy assignment or configuration.

(R)AN Node

FIG. 7 is a block diagram illustrating the main components of an exemplary (R)AN node, for example a base station ('gNB' in 5G). As shown, the (R)AN node includes a transceiver circuit 51 which is operable to transmit signals to and to receive signals from connected UE(s) via one or more antenna 52 and to transmit signals to and to receive signals from other network nodes (either directly or indirectly) via a network interface 55. A controller 53 controls the operation of the (R)AN node in accordance with software stored in a memory 54. Software may be pre-installed in the memory 54 and/or may be downloaded via the telecommunication network or from a removable data storage device (RMD), for example. The software includes, among other things, an operating system 541 and a communications control module 542 having at least a transceiver control module 5421. The communications control module 542 (using its transceiver control module 5421) is responsible for handling (generating/sending/receiving) signaling between the (R)AN node and other nodes, such as the UE, the AMF, and the UDM (e.g. indirectly). The signaling may include, for example, appropriately formatted signaling messages relating to a radio connection and mobility management procedures (for a particular UE), and in particular, signaling messages relating to network slice privacy assignment or configuration.

Modifications and Alternatives

Detailed embodiments have been described above. As those skilled in the art will appreciate, a number of modifications and alternatives can be made to the above embodiments whilst still benefiting from the inventions embodied therein. By way of illustration only a number of these alternatives and modifications will now be described.

In the above description, the UE, the AMF, and the (R)AN node are described for ease of understanding as having a number of discrete modules (such as the communication control modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

Each controller may comprise any suitable form of processing circuitry including (but not limited to), for example: one or more hardware implemented computer processors; microprocessors; central processing units (CPUs); arithmetic logic units (ALUs); input/output (TO) circuits; internal memories/caches (program and/or data); processing registers; communication buses (e.g. control, data and/or address buses); direct memory access (DMA) functions; hardware or software implemented counters, pointers and/or timers; and/or the like.

In the above embodiments, a number of software modules were described. As those skilled in the art will appreciate, the software modules may be provided in compiled or un-compiled form and may be supplied to the UE, the AMF, and the (R)AN node as a signal over a computer network, or on a recording medium. Further, the functionality performed by part or all of this software may be performed using one or more dedicated hardware circuits. However, the use of software modules is preferred as it facilitates the updating of the UE, the AMF, and the (R)AN node in order to update their functionalities.

In the above embodiments, a 3GPP radio communications (radio access) technology is used. However, any other radio communications technology (e.g. WLAN, Wi-Fi, WiMAX, Bluetooth, etc.) may also be used in accordance with the above embodiments.

Items of user equipment might include, for example, communication devices such as mobile telephones, smartphones, user equipment, personal digital assistants, laptop/tablet computers, web browsers, e-book readers and/or the like. Such mobile (or even generally stationary) devices are typically operated by a user, although it is also possible to connect so-called 'Internet of Things' (IoT) devices and similar machine-type communication (MTC) devices to the network. For simplicity, the present application refers to mobile devices (or UEs) in the description but it will be appreciated that the technology described can be implemented on any communication devices (mobile and/or generally stationary) that can connect to a communications network for sending/receiving data, regardless of whether such communication devices are controlled by human input or software instructions stored in memory.

Various other modifications will be apparent to those skilled in the art and will not be described in further detail here.

Abbreviations and Terminology

The following abbreviations and terminology are used in the current document:

5GS 5G System
5G-AN 5G Access Network
5G-RAN 5G Radio Access Network
AF Application Function
AMF Access and Mobility Management Function
APN Access Point Name
AS Access Stratum
AUSF Authentication and Security Function
CP Control Plane
DNN Data Network Name
NAS Non Access Stratum
NF Network Function
NR New Radio
NRF Network Repository Function
NSSF Network Slice Selection Function
(R)AN Radio Access Network
UDM Unified Data Management
UE User Equipment Second Example Embodiment Next, with reference to FIGS. 8 and 9, a second example embodiment of the present disclosure will be described. In the second example embodiment, a system having user equipment 100 and a core network node 200 will be described.

FIG. 8 shows an example of a configuration of the system. With reference to FIG. 8, the system has the user equipment 100 and the core network node 200. As shown in FIG. 8, the user equipment 100 and the core network node 200 are connected so as to be capable of communicating with each other.

The user equipment 100 is an information processing device that performs communication using network slices obtained by logically dividing a network. The user equipment 100 sends information to the core network node 200. To be specific, the user equipment 100 sends information related to security of a slice to the core network node 200 (FIG. 9, S101).

Further, the user equipment 100 receives a request sent in accordance with the above-mentioned information related to security from the core network node 200 (FIG. 9, S102). Then, the user equipment 100 sends identity information of the slice to the core network node 200 in a secure method based on the received request (FIG. 9, S103).

The core network node 200 is an information processing device connected to the user equipment 100 so as to be capable of communicating with each other. The core network node 200 receives information related to security of a slice from the user equipment 100. Then, the core network node 200 sends a request to send information in a secure method to the user equipment 100 based on the received information.

Thus, the system in this example embodiment has the user equipment 100 and the core network node 200. With such a configuration, the core network node 200 can send a request to send information in a secure method to the user equipment 100 based on information received from the user equipment 100. Moreover, the user equipment 100 can send identity information of a slice to the core network node 200 in a secure method based on a request received from the core network node 200.

Further, a control method executed by the user equipment 100 described above (a privacy consideration method) is a method including:

sending information related to security of at least one network slice; and sending identity information of the at least one network slice in a secure method based on a request to send data in the secure method, the request being sent from a core network node based on the sent information.

Further, a control method executed by the core network node 200 described above (a privacy consideration method) is a method including, upon receiving information related to security of at least one network slice from user equipment, sending a request to send data in a secure method based on the received information.

The inventions of the program and the control method (privacy consideration method) with the above-mentioned configurations have the similar effects to the user equipment 100 and the core network node 200, and therefore, can achieve the above-mentioned object of the present disclosure.

<Supplementary Notes>

The whole or part of the example embodiments disclosed above can be described as the following supplementary notes. Below, the outline of the UE and so on according to the present invention will be described. The present invention, however, is not limited to the following configurations.

(Supplementary Note 1)

User equipment comprising:

means for sending information related to security of at least one network slice; and means for sending identity information of the at least one network slice in a secure method based on a request to send data in the secure method, the request being sent from a core network node based on the sent information.

(Supplementary Note 2)

The user equipment according to Supplementary Note 1, wherein the information related to security of the at least one network slice includes information indicating that information for the at least one network slice is with security consideration.

(Supplementary Note 3)

The user equipment according to Supplementary Note 1 or 2, further comprising:

means for receiving an identity request message from the core network node, the identity request message including information requesting the user equipment to send information of the at least one network slice in an identity response message; and means for sending the identity response message to the core network node, the identity response message including the identity information of the at least one network slice.

(Supplementary Note 4)

The user equipment according to one of Supplementary Notes 1-3, further comprising means for receiving information related to security for each network slice.

(Supplementary Note 5)

The user equipment according to one of Supplementary Notes 1-4, wherein the information related to security of the at least one network slice includes information requesting secure data transmission for all network slices.

(Supplementary Note 6)

The user equipment according to Supplementary Note 5, further comprising means for encrypting the identity information of the at least one network slice by using information for secure data transmission and sending the encrypted identity information.

(Supplementary Note 7)

The user equipment according to one of Supplementary Notes 1-6, further comprising:

means for sending identity information of at least one of other network slices than the at least one network slice to an access network node to allow the access network node to select the core network node; and means for sending the identity information of the at least one network slice in the secure method to the selected core network node.

(Supplementary Note 8)

A core network node comprising means for, when receiving information related to security of at least one network slice from user equipment, sending a request to send data in a secure method based on the received information.

(Supplementary Note 9)

The core network node according to Supplementary Note 8, wherein the information related to security of the at least one network slice includes information indicating that information for the at least one network slice is with security consideration.

(Supplementary Note 10)

The core network node according to Supplementary Note 8 or 9, further comprising:

means for sending an identity request message to the user equipment, the identity request message including information requesting the user equipment to send identity information of the at least one network slice in an identity response message; and means for receiving the identity response message including the identity information of the at least one network slice from the user equipment.

(Supplementary Note 11)

The core network node according to one of Supplementary Notes 8-10, further comprising means for sending information related to security for each network slice to the user equipment.

(Supplementary Note 12)

The core network node according to one of Supplementary Notes 8-11, wherein the information related to security of the at least one network slice includes information requesting secure data transmission for all network slices.

(Supplementary Note 13)

The core network node according to Supplementary Note 12, further comprising means for sending information for secure data transmission based on the information requesting secure data transmission.

(Supplementary Note 14)

The core network node according to one of Supplementary Notes 8-13, further comprising means for determining to re-route the user equipment to another core network node, based on the received identity information of the at least one network slice in the secure method from the user equipment.

(Supplementary Note 15)

A control method in user equipment, the control method comprising:

sending information related to security of at least one network slice; and sending identity information of the at least one network slice in a secure method based on a request to send data in the secure method, the request being sent from a core network node based on the sent information.

(Supplementary Note 16)

The control method according to Supplementary Note 15, wherein the information related to security of the at least one network slice includes information indicating that information for the at least one network slice is with security consideration.

(Supplementary Note 17)

The control method according to Supplementary Note 15 or 16, further comprising:

receiving an identity request message from the core network node, the identity request message including information requesting the user equipment to send information of the at least one network slice in an identity response message; and sending the identity response message to the core network node, the identity response message including the identity information of the at least one network slice.

(Supplementary Note 18)

The control method according to one of Supplementary Notes 15-17, further comprising receiving information related to security for each network slice.

(Supplementary Note 19)

The control method according to one of Supplementary Notes 15-18, wherein the information related to security of the at least one network slice includes information requesting secure data transmission for all network slices.

(Supplementary Note 20)

The control method according to Supplementary Note 19, further comprising encrypting the identity information of the at least one network slice by using information for secure data transmission and sending the encrypted identity information.

(Supplementary Note 21)

The control method according to one of Supplementary Notes 15-20, further comprising:

sending identity information of at least one of other network slices than the at least one network slice to an access network node to allow the access network node to select the core network node; and sending the identity information of the at least one network slice in the secure method to the selected core network node.

(Supplementary Note 22)

A control method in a core network node, the control method comprising, when receiving information related to security of at least one network slice from user equipment, sending a request to send data in a secure method based on the received information.

(Supplementary Note 23)

The control method according to Supplementary Note 22, wherein the information related to security of the at least one network slice includes information indicating that information for the at least one network slice is with security consideration.

(Supplementary Note 24)

The control method according to Supplementary Note 22 or 23, further comprising:

sending an identity request message to the user equipment, the identity request message including information requesting the user equipment to send information of the at least one network slice in an identity response message; and receiving the identity response message including the identity information of the at least one network slice.

(Supplementary Note 25)

The control method according to one of Supplementary Notes 22-24, further comprising sending information related to security for each network slice to the user equipment.

(Supplementary Note 26)

The control method according to one of Supplementary Notes 22-25, wherein the information related to security of the at least one network slice includes information requesting secure data transmission for all network slices.

(Supplementary Note 27)

The control method according to Supplementary Note 26, further comprising sending information for secure data transmission based on the information requesting secure data transmission.

(Supplementary Note 28)

The control method according to one of Supplementary Notes 22-27, further comprising determining to re-route the user equipment to another core network node, based on the received identity information of the at least one network slice in the secure method from the user equipment.

(Supplementary Note 29)

A mobile communication system, comprising:
user equipment configured to send information related to security of at least one network slice; and
a core network node configured to send a request to send data in a secure method, based on the information received from the user equipment,
wherein the user equipment is further configured to send identity information of the at least one network slice in the secure method, based on the request.

(Supplementary Note 30)

The mobile communication system according to Supplementary Note 29, wherein the information related to security of the at least one network slice includes information indicating that information for the at least one network slice is with security consideration.

(Supplementary Note 31)

The mobile communication system according to Supplementary Note 29 or 30, wherein:
the core network node is further configured to send an identity request message including information requesting the user equipment to send information of the at least one network slice in an identity response message; and
the user equipment is further configured to send the identity response message including the identity information of the at least one network slice.

(Supplementary Note 32)

The mobile communication system according to one of Supplementary Notes 29-31, wherein the user equipment is further configured to receive information related to security for each network slice.

(Supplementary Note 33)

The mobile communication system according to one of Supplementary Notes 29-32, wherein the information related to security of the at least one network slice includes information requesting secure data transmission for all network slices.

(Supplementary Note 34)

The mobile communication system according to Supplementary Note 33, wherein the core network node is further configured to send information for secure data transmission based on the information requesting secure data transmission.

(Supplementary Note 35)

The mobile communication system according to Supplementary Note 34, wherein the user equipment is further configured to encrypt the identity information of the at least one network slice by using the information for secure data transmission, and send the encrypted identity information.

(Supplementary Note 36)

The mobile communication system according to one of Supplementary Notes 29-35, further comprising an access network node, wherein:
the user equipment is further configured to send identity information of the at least one of other network slices than the at least one network slice, to the access network node to allow the access network node to select the core network node; and
the user equipment is further configured to send the identity information of the at least one network slice in the secure method, to the selected core network node.

(Supplementary Note 37)

The mobile communication system according to one of Supplementary Notes 29-36, wherein the core network node is further configured to determine to re-route the user equipment to another core network node, based on the received identity information of the at least one network slice in the secure method from the user equipment.

A program disclosed in the respective example embodiments and supplementary notes is stored in a storage device or recorded on a computer-readable recording medium. For example, the recording medium is a portable medium such as a flexible disk, an optical disk, a magneto-optical disk, and a semiconductor memory.

The present invention has been described above with reference to the example embodiments, but the present invention is not limited to the example embodiments described above. The configurations and details of the present invention can be changed in various manners that can be understood by those skilled in the art within the scope of the present invention.

This application is based upon and claims the benefit of priority from European patent application No. 17177701.4, filed on Jun. 23, 2017, the disclosure of which is incorporated herein in its entirely by reference.

The invention claimed is:

1. A User Equipment (UE) comprising:
one or more memories storing instructions; and
one or more processors configured to execute the instructions to:
receive, from an Access and Mobility Management Function (AMF) node, a registration accept message including mobility restrictions if the mobility restrictions apply for the UE, and a parameter indicating whether or not the UE includes a first Network Slice Selection Assistance Information (NSSAI) according to a control of an operator, wherein the reception of the registration accept message including the parameter controls the UE to enable a privacy for the first NSSAI, and
include a second NSSAI in a Non Access Stratum (NAS) message based on the parameter.

2. A control method in a User Equipment (UE), the control method comprising:
receiving, from an Access and Mobility Management Function (AMF) node, a registration accept message including mobility restrictions if the mobility restrictions apply for the UE, and a parameter indicating whether or not the UE includes a first Network Slice Selection Assistance Information (NSSAI) according to a control of an operator, wherein the reception of the registration accept message including the parameter controls the UE to enable a privacy for the first NSSAI; and
including a second NSSAI in a Non Access Stratum (NAS) message based on the parameter.

3. An Access and Mobility Management Function (AMF) node, comprising:
one or more memories storing instructions; and
one or more processors configured to execute the instructions to:
send, to a User Equipment (UE), a registration accept message including mobility restrictions if the mobility restrictions apply for the UE, and a parameter indicating whether or not the UE includes a first Network Slice Selection Assistance Information (NSSAI) according to a control of an operator, wherein the reception of the registration accept message including the parameter controls the UE to enable a privacy for the first NSSAI, and
cause the UE to include a second NSSAI in a Non Access Stratum (NAS) message based on the parameter.

4. A control method of an Access and Mobility Management Function (AMF) node, the control method comprising:
sending, to a User Equipment (UE), a registration accept message including mobility restrictions if the mobility restrictions apply for the UE, and a parameter indicating whether or not the UE includes a first Network Slice Selection Assistance Information (NSSAI) according to a control of an operator, wherein the reception of the registration accept message including the parameter controls the UE to enable a privacy for the first NSSAI; and
causing the UE to include a second NSSAI in a Non Access Stratum (NAS) message based on the parameter.

5. The UE of claim 1, wherein the parameter indicates that the UE shall treat a first slice of a plurality of slices as private.

* * * * *